United States Patent
Wang et al.

(10) Patent No.: US 6,362,878 B1
(45) Date of Patent: Mar. 26, 2002

(54) MULTIPOINT WAVELENGTH CALIBRATION TECHNIQUE

(75) Inventors: Gary Wang; Paul S. Bussard, both of Santa Rosa; Zoltan D. Azary, Occidental; Kenneth R. Wildnauer; Peter Egerton, both of Santa Rosa, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/430,338

(22) Filed: Oct. 29, 1999

(51) Int. Cl.$^7$ .................................................. G01J 3/00
(52) U.S. Cl. ........................ 356/300; 356/328; 356/334
(58) Field of Search ................................. 356/300, 319, 356/326, 328, 331, 333, 334, 243.1

(56) References Cited

U.S. PATENT DOCUMENTS 4,669,878 A * 6/1987 Meier .......................... 356/319

OTHER PUBLICATIONS

Technical Digest—Symposium on Optical Fiber Measurements, 1992; Digest of a symposium sponsored by the National Institute of Standards and Technology in cooperation with the IEEE Lasers and Electro–Optics Society and the Optical Society of America; Sep. 15–17, 1992; pp. 191–194.

2010WR Series—Wavelength Reference Standard—Preliminary; Newport, pp. 2–18 and 2–19, undated.

* cited by examiner

Primary Examiner—F. L. Evans
(74) Attorney, Agent, or Firm—Robert T. Martin

(57) ABSTRACT

Improved calibration of optical wavelength measuring instruments. In a first embodiment, improved calibration is achieved in an optical wavelength measuring instrument by performing calibration measurements at a plurality of known wavelengths and using an average calibration constant derived from the plurality of measurements. In a second embodiment, improved calibration is achieved by performing calibration measurements at a plurality of known wavelengths and calculating a linear or higher order calibration model, or a periodic model. These approaches may be extended by segmenting the wavelength range and using different calculated calibration values, or different calibration models, for each segment.

27 Claims, 3 Drawing Sheets

MULTIPOINT WAVELENGTH CALIBRATION TECHNIQUE

BACKGROUND OF THE INVENTION

1. Field of the Invention

The invention pertains to the field of optical wavelength measuring instruments such as optical spectrum analyzers. It further pertains to techniques for calibrating optical wavelength measuring instruments.

2. Art Background

Optical instruments used for measuring wavelength, such as optical spectrum analyzers (OSA) are called upon to make measurements over a range of wavelengths. To verify the accuracy of these measurements, instrument calibration is necessary. Prior techniques involve calibrating the device of interest using a single wavelength standard, such as a calibrated source, or a known absorption pit in a gas cell. While calibration at a single point insures measurement accuracy at and near that single point, measurement accuracy over a wider range can only be implied or estimated. Particularly, single point calibration does not correct for any errors in linearity of the optical instrument over a wide wavelength range.

SUMMARY OF THE INVENTION

Wavelength measurement accuracy in an optical instrument over its wavelength range is improved by calibrating the instrument using many reference points. In a first embodiment of the invention, multiple calibration points are used to form an average correction factor. In a second embodiment of the invention, multiple reference points are used to fit a correction function applied over the wavelength range. This correction function may be linear, higher order, or periodic in nature. One correction function may be used over the range of the device, or the range may be segmented, and different correction values calculated and used for each segment.

BRIEF DESCRIPTION OF THE DRAWINGS

The present invention is described with respect to particular exemplary embodiments thereof and reference is made to the drawings in which.

DETAILED DESCRIPTION

While the present invention is equally applicable to wavelength meters and wavelength determining devices based upon techniques such as Michelson, Fabry-Perot, or Fizeau interferometry, it will be discussed in terms of devices using diffraction gratings. It is also understood that wavelength and frequency are reciprocal terms, and are equivalent, so that measuring wavelength and measuring frequency are equivalent. Similarly, a frequency standard is also a wavelength standard.

Figure 1:
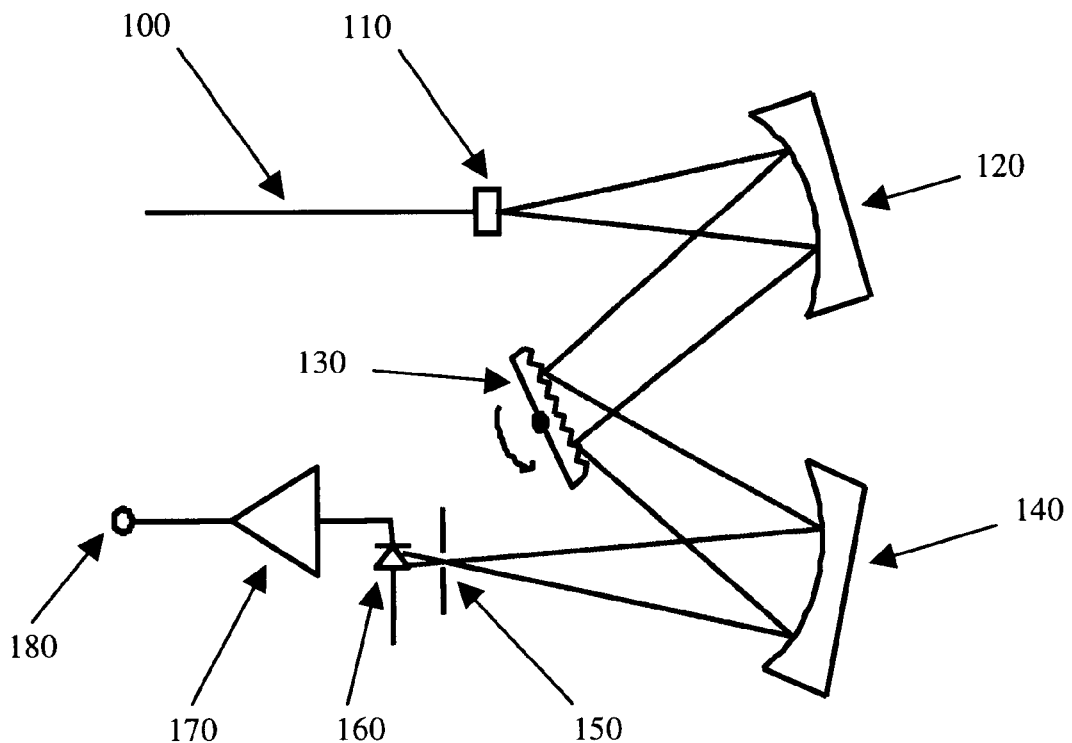
FIG. 1 is a diagram of a diffraction grating based monochromator.

A typical diffraction grating device, often referred to as a single-pass monochromator, is shown in FIG. 1. Optical input along fiber 100 to aperture 110 illuminates first mirror 120. Mirror 120 directs the optical input to rotatable diffraction grating 130. Diffraction grating 130 disperses light at an angle proportional to its wavelength. Light dispersed from grating 130 is focused by second mirror 140 through aperture 150 and on to photodetector 160. The output of photodetector 160 is amplified 170 producing output 180. While the invention is shown in terms of its application to a single pass monochromator, it is also applicable to cascaded single-pass, double-pass, and other monochromator designs. It is also applicable to spectrometers and spectrophotometers, where the grating is not moved. In such systems, the present invention is applicable to remove pitch errors in the detector array, changes in dispersion due to environmental changes, and calibrating the line spacing of the grating.

In general terms, measured wavelength l is a function of grating angle w, and may be written as:

$$l = f(a_0, a_1, w)$$

where $a_0$ and $a_1$ are design values.

In other monochromator schemes, while the physical variable may be different, such as the displacement of an optical member or the voltage applied to an electro-optical device rather than the rotation angle of a grating, the same functional model applies: mapping the input variable w on to a wavelength value l.

Traditional single point calibration assumes an offset in positioning is uniform across the operation of the device. Given a reference of a known wavelength, a calibration constant, c0, is derived so that the corrected wavelength, $l_c$, appears at:

$$l_c = f(c_0 + a_0, a_1, w)$$

This calibration may be performed by tuning the monochromator to an estimated position for the known wavelength, which may be the result of prior calibration, and then searching for the known wavelength as a local minima (for absorption lines) or maxima (for emission peaks). The difference between the final position and the initial estimated position is the correction value $c_0$.

Suitable references providing emission peaks at known wavelengths include but are not limited to calibrated lasers, tunable dye lasers, and other excited gas spectra. Other stable references are provided by the absorption lines of gases, such as acetylene ($C_2H_2$), hydrogen cyanide (HCN), hydrogen iodide, carbon monoxide, or methane. These sources, when illuminated by a broadband source, provide sharp and deep absorption lines at known wavelengths. For the purposes of the present invention, any source presenting a set of either peaks or absorption lines with the required stability and measurement predictability may be used.

Single point calibration results in improved measurement accuracy near the calibration point. It assumes that the response of the system as a whole is linear over remaining wavelengths, and that a single static term will correct the system. It also assumes the error characteristics of the system overall are similar to those at the calibration point.

In a first embodiment of the present invention, a single calibration value is derived, but it is derived from multiple calibration points. According to the first embodiment of the present invention, rather than taking a single calibration error measurement, a plurality of calibration error measurements are taken, corresponding to a plurality of known wavelengths. For example, using the known absorption spectrum of acetylene gas as a reference, measurements are made for a plurality of absorption lines, each measurement producing a calibration error value. An average of these calibration error values is calculated, and that average used as the calibration constant $c_0$. A weighted average may also be used.

One approach to computing a weighted average first examines the data points and removes any outlying points. This is done by removing points at the extremes which are separated more than an error tolerance from their neighbors. Next, points are collected which are within a specified measurement uncertainty of the minimum and maximum values in the remaining set of points. Those points within the measurement uncertainty of the minimum and maximum are given a weight of 100%; the remaining points are given a weight of 0%. Other statistical approaches may also be used.

Figure 2:
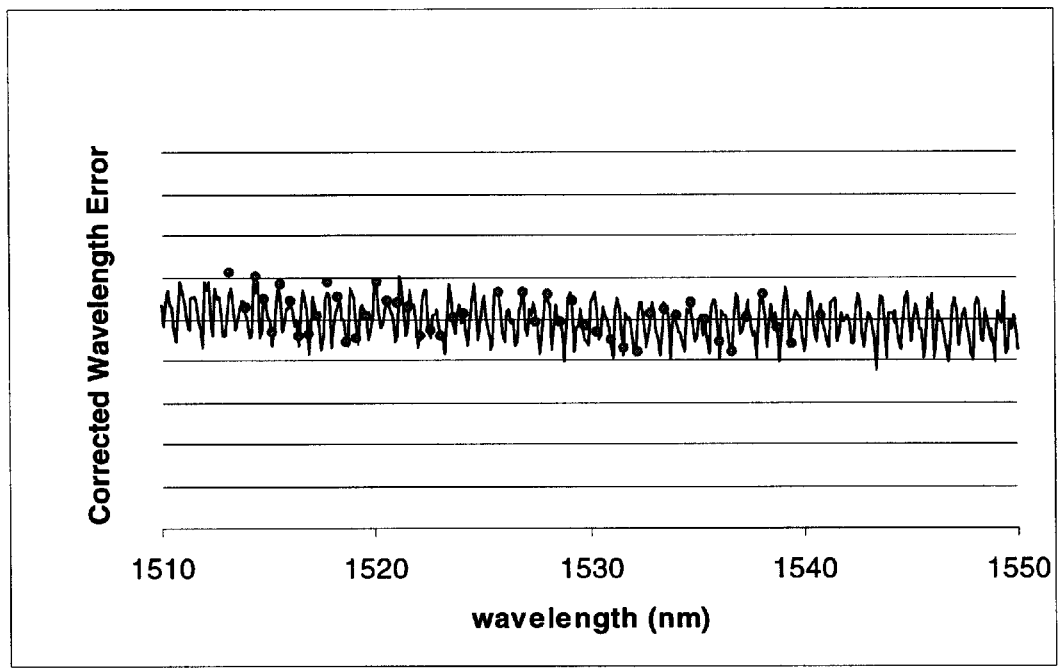
FIG. 2 shows the corrected wavelength error according to a first embodiment of the invention.

The calibration method according to the first embodiment of the present invention trades off a loss of accuracy at a single point for improved accuracy over the wavelength range used in taking the individual measurements. The corrected wavelength error of an optical spectrum analyzer using this calibration method is shown in FIG. 2. This method may be extended by segmenting the wavelength range, and calculating and then using separate constants $c_0$ for each segment.

The second embodiment of the preferred invention recognizes that the error properties of the device may not be uniform over its measurement range. In this embodiment, a plurality of calibration error measurements are taken at known wavelengths, producing a plurality of calibration error values. This data is used to fit a higher order correction model. While the preferred embodiment uses a least-squares fit linear model, producing an offset and a slope, higher order corrections such as B-splines or polynomials may also be used. Using the least-squares linear model, the equation mapping position w onto corrected wavelength $l_c$ becomes:

$$l_c = f(c_0 + a_0, c_1 a_1 w)$$

Given n calibration measurements, i=1 ... n, producing pairs of points ($w_i$, $v_i$), $c_0$ and $c_1$ may be calculated in the usual fashion as:

$$c_1 = \frac{n \sum_1^n w_i v_i - \left(\sum_1^n w_i\right)\left(\sum_1^n v_i\right)}{n \sum_1^n w_i^2 - \left(\sum_1^n w_i\right)^2}$$

$$c_0 = \frac{\sum_1^n v_i}{n} - c_1 \frac{\sum_1^n w_i}{n}$$

Figure 3:
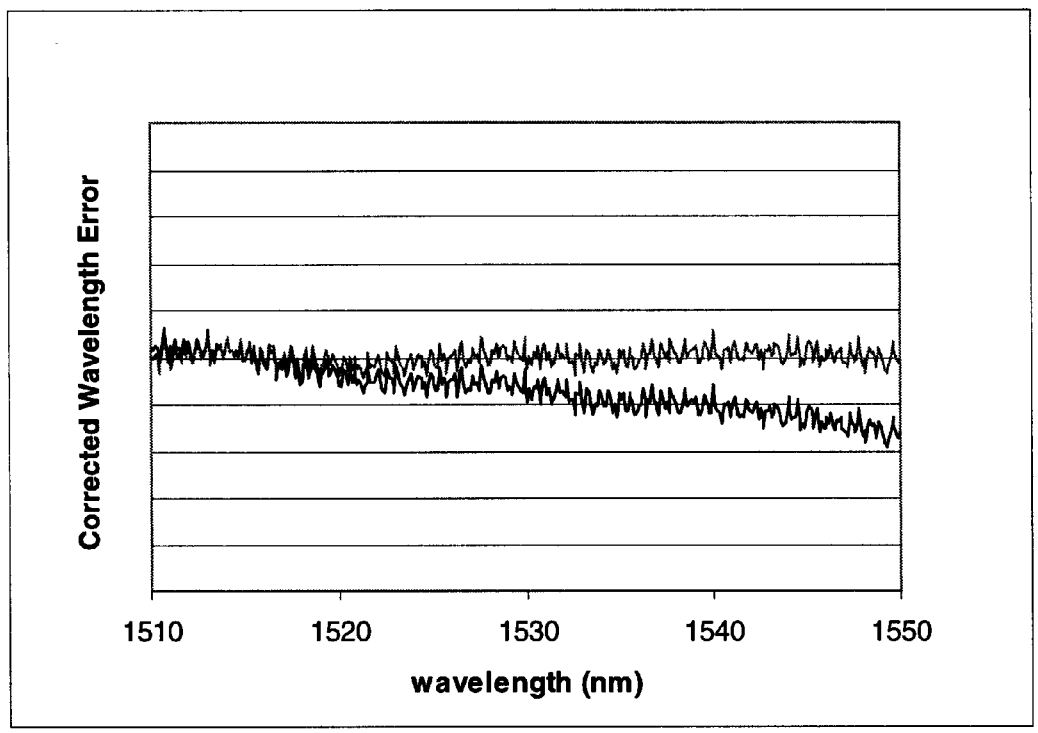
FIG. 3 shows the corrected wavelength error according to a second embodiment of the invention.

FIG. 3 shows the corrected wavelength error in an optical spectrum analyzer using this second embodiment. The top line on the graph shows instrument response corrected using the linear fit model, and the lower line on the graph shows the uncorrected version. In a further refinement of the invention, the wavelength range of the device is segmented, and separate correction values ($c_0$, $c_1$) are calculated and used for each segment.

Higher order calibration models may also be used, such as quadratic, B-spline, or other polynomial models. These may be applied in a segmented or a single span approach.

A particular higher order model of interest may be used when the error is periodic in nature. As shown in FIG. 2, the error characteristics of a particular system may contain components which are periodic in nature. Standard analytical techniques may be used to fit a periodic function to this error data. It should be noted that if there exists apriori information about the error function, the period or spacing of the calibration points can be less than the Nyquist criteria, and a valid correction function can still be derived from this "under-sampled" case. The resulting function, for example, a Fourier series, is then applied as a correction function. As with other embodiments of the invention, a single function may be used spanning the wavelength range of the device, or the range may be segmented and different fits used for each segment. Indeed, there may be specific wavelength regions where higher accuracy is desired, and others where lower accuracy may be tolerated. These may be accommodated by allowing the use of different correction models in different segments of device operation.

For example, in the critical 1.5 and 1.6 micrometer segments, a high order correction such as a periodic correction function may be used. The wavelength segments adjoining there critical regions could use the linear fit model, and the remaining segments could use a simple single term correction.

When a correction model is calculated over an interval smaller than the operating span of the device, care must be used in extrapolating the results obtained over a small interval over the larger span. In extremes, applying a correction model valid over a small interval may actually increase the error at the extremes. One approach is to only apply the correction model to the range over which it was calculated. A second approach is to apply the correction model over a wider range, determined by the error characteristics of the particular device, for example, allowing it to be applied to predetermined bounds above and below the calculated range. As previously described, outside this extended range, other approaches, such as single term correction, may be applied.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. A method of calibrating an optical wavelength measuring system having a wavelength range using a reference having a plurality of known wavelengths or frequencies, comprising:
    making a plurality of measurements at a plurality of known reference wavelengths covering a measurement range,
    deriving a set of error values from the plurality of measurements, and
    deriving a calibration model from the set of error values.

2. The method of claim 1 where the calibration model provides a single calibration constant.

3. The method of claim 2 where the single calibration constant is applied over the measurement range.

4. The method of claim 2 where the single calibration constant is applied over a predetermined range larger than the measurement range.

5. The method of claim 2 where the single calibration constant is applied over the wavelength range of the optical wavelength measurement system.

6. The method of claim 2 where the wavelength range of the optical wavelength measurement system is divided into segments and a calibration constant is derived and applied to each segment.

7. The method of claim 1 where the calibration model provides a single calibration constant computed from a weighted average of the set of error values.

8. The method of claim 7 where the single calibration constant is applied over the wavelength range of the optical wavelength measurement system.

9. The method of claim 7 where the single calibration constant is applied over the measurement range.

10. The method of claim 7 where the single calibration constant is applied over a predetermined range larger than the measurement range.

11. The method of claim 7 where the wavelength range of the optical wavelength measurement system is divided into segments and a calibration constant is derived and applied to each segment.

12. The method of claim 1 where the calibration model provides a linear correction computed from the set of error values.

13. The method of claim 12 where the linear correction is applied over the wavelength range of the optical wavelength measurement system.

14. The method of claim 12 where the linear correction is applied over the measurement range.

15. The method of claim 12 where the linear correction is applied over a predetermined range larger than the measurement range.

16. The method of claim 12 where the wavelength range of the optical wavelength measurement system is divided into segments and the linear correction is derived and applied to each segment.

17. The method of claim 1 where the calibration model provides a higher order correction computed from the set of error values.

18. The method of claim 17 where the higher order correction is applied over the wavelength range of the optical wavelength measurement system.

19. The method of claim 18 where the higher order correction is applied over the measurement range.

20. The method of claim 19 where the higher order correction is applied over a predetermined range larger than the measurement range.

21. The method of claim 17 where the wavelength range of the optical wavelength measurement system is divided into segments and the higher order correction is derived and applied to each segment.

22. The method of claim 1 where the calibration model provides a periodic correction computed from the set of error values.

23. The method of claim 22 where the periodic correction is applied over the wavelength range of the optical wavelength measurement system.

24. The method of claim 22 where the periodic correction is applied over the measurement range.

25. The method of claim 22 where the periodic correction is applied over a predetermined range larger than the measurement range.

26. The method of claim 22 where the wavelength range of the optical wavelength measurement system is divided into segments and the periodic correction is derived and applied to each segment.

27. The method of claim 1 where the wavelength range of the optical wavelength measurement system is divided into segments and different correction models are applied to different segments.

* * * * *